United States Patent
B et al.

(10) Patent No.: US 10,275,310 B2
(45) Date of Patent: Apr. 30, 2019

(54) UPDATING EXCLUSIVE-OR PARITY DATA

(71) Applicant: Western Digital Technologies, Inc., Irvine, CA (US)

(72) Inventors: Ajith Kumar B, Karnataka (IN); Arun Kumar Medapati, Andhra Pradesh (IN)

(73) Assignee: Western Digital Technologies, Inc., San Jose, CA (US)

(*) Notice: Subject to any disclaimer, the term of this patent is extended or adjusted under 35 U.S.C. 154(b) by 111 days.

(21) Appl. No.: 14/642,218

(22) Filed: Mar. 9, 2015

(65) Prior Publication Data
US 2016/0266965 A1 Sep. 15, 2016

(51) Int. Cl.
H03M 13/00 (2006.01)
G06F 11/10 (2006.01)

(52) U.S. Cl.
CPC .................................. G06F 11/108 (2013.01)

(58) Field of Classification Search
CPC .... G06F 11/1068; G06F 3/0619; G11C 29/52
See application file for complete search history.

(56) References Cited

U.S. PATENT DOCUMENTS

| | | | | |
|---|---|---|---|---|
| 6,467,022 B1* | 10/2002 | Buckland | ............... | G06F 3/0611 711/113 |
| 6,912,687 B1* | 6/2005 | Gates | ................... | G06F 11/1076 714/6.2 |
| 7,310,745 B2* | 12/2007 | Schnapp | ............... | G06F 3/0614 714/5.1 |
| 7,612,583 B2* | 11/2009 | Winograd | ............ | H03K 19/215 326/52 |
| 8,200,887 B2* | 6/2012 | Bennett | ............... | G06F 11/1068 365/145 |
| 8,438,455 B2 | 5/2013 | Vogan et al. | | |
| 8,464,093 B1* | 6/2013 | Swenson | ............... | G06F 11/108 714/5.1 |
| 8,533,550 B2 | 9/2013 | Khan | | |
| 8,656,101 B2 | 2/2014 | Werner et al. | | |
| 8,732,538 B2 | 5/2014 | Krishnamoorthy | | |
| 8,832,528 B2* | 9/2014 | Thatcher | ............... | G06F 11/073 714/758 |
| 8,959,420 B1* | 2/2015 | Piszczek | ................. | G06F 12/10 714/6.22 |

(Continued)

OTHER PUBLICATIONS

"Intel Solid-State Drive DC S3700 Datacenter RAS Features,"Intel Corporation, http://www.intel.com/design/literature.htm, Oct. 2012, 11 pp.

Primary Examiner — Esaw T Abraham
(74) Attorney, Agent, or Firm — Vierra Magen Marcus LLP

(57) ABSTRACT

A storage device may include a non-volatile memory; and a controller. The controller may be configured to store a plurality of blocks of data in the memory, determine exclusive-or (XOR) parity data for the plurality of blocks, and store the XOR parity data in the memory; store a second block of data in the memory. The controller may be further configured to generate updated XOR parity data by at least XORing a first block of the plurality of blocks and the second block of data with the XOR parity data to remove the first block from the XOR parity data and to add the second block to the XOR parity data, and store the updated XOR parity data in the memory.

20 Claims, 3 Drawing Sheets

(56) References Cited

U.S. PATENT DOCUMENTS

2012/0131381 A1    5/2012   Eleftheriou et al.
2014/0173177 A1    6/2014   Benhase et al.
2014/0189212 A1    7/2014   Slaight et al.

* cited by examiner

UPDATING EXCLUSIVE-OR PARITY DATA

TECHNICAL FIELD

This disclosure relates to parity data, and more particularly, to updating exclusive-or parity data.

BACKGROUND

Memory devices used in computers or other electronics devices may be non-volatile memory or volatile memory. The main difference between non-volatile memory and volatile memory is that non-volatile memory may continue to store data without requiring a persistent power supply. As a result, non-volatile memory devices have developed into a popular type of memory for a wide range of electronic applications. For instance, non-volatile memory devices, including flash memory devices, are commonly incorporated into solid-state storage devices, such as solid-state drives (SSDs).

In some examples, when writing data to the flash memory, a controller may perform one or more operations to protect the data from memory errors. For instance, in addition to writing the data to the flash memory, a controller may generate and write parity data to the memory that may be used to restore the data, such as in the event of a memory error.

SUMMARY

In one example, a method includes storing, by a controller of a storage device, a plurality of blocks of data in a memory of the storage device; determining, by the controller, exclusive-or (XOR) parity data for the plurality of blocks of data; storing, by the controller, the XOR parity data in the memory; storing a second block of data in the memory; generating updated XOR parity data by at least XORing a first block of the plurality of blocks and the second block of data with the XOR parity data to remove the first block from the XOR parity data and to add the second block to the XOR parity data; and storing the updated XOR parity data in the memory In another example, a data storage device includes a memory, and a controller. In this example, the controller is configured to: store a plurality of blocks of data in the memory; determine XOR parity data for the plurality of blocks; store the XOR parity data in the memory; store a second block of data in the memory; generate updated XOR parity data by at least XORing a first block of the plurality of blocks and the second block of data with the XOR parity data to remove the first block from the XOR parity data and to add the second block to the XOR parity data; and store the updated XOR parity data in the memory.

In another example, a computer-readable storage medium stores instructions that, when executed, cause one or more processors of a data storage device to: store a plurality of blocks of data in a memory of the storage device; determine XOR parity data for the plurality of blocks of data; store the XOR parity data in the memory; store a second block of data in the memory; generate updated XOR parity data by at least XORing a first block of the plurality of blocks and the second block of data with the XOR parity data to remove the first block from the XOR parity data and to add the second block to the XOR parity data; and store the updated XOR parity data in the memory In another example, a system includes means for storing a plurality of blocks of data in a memory of a storage device; means for determining XOR parity data for the plurality of blocks of data; means for storing the XOR parity data in the memory; means for storing a second block of data in the memory; means for generating updated XOR parity data by at least XORing a first block of the plurality of blocks and the second block of data with the XOR parity data to remove the first block from the XOR parity data and to add the second block to the XOR parity data; and means for storing the updated XOR parity data in the memory.

The details of one or more examples are set forth in the accompanying drawings and the description below. Other features, objects, and advantages will be apparent from the description and drawings, and from the claims.

DETAILED DESCRIPTION

Figure 1:
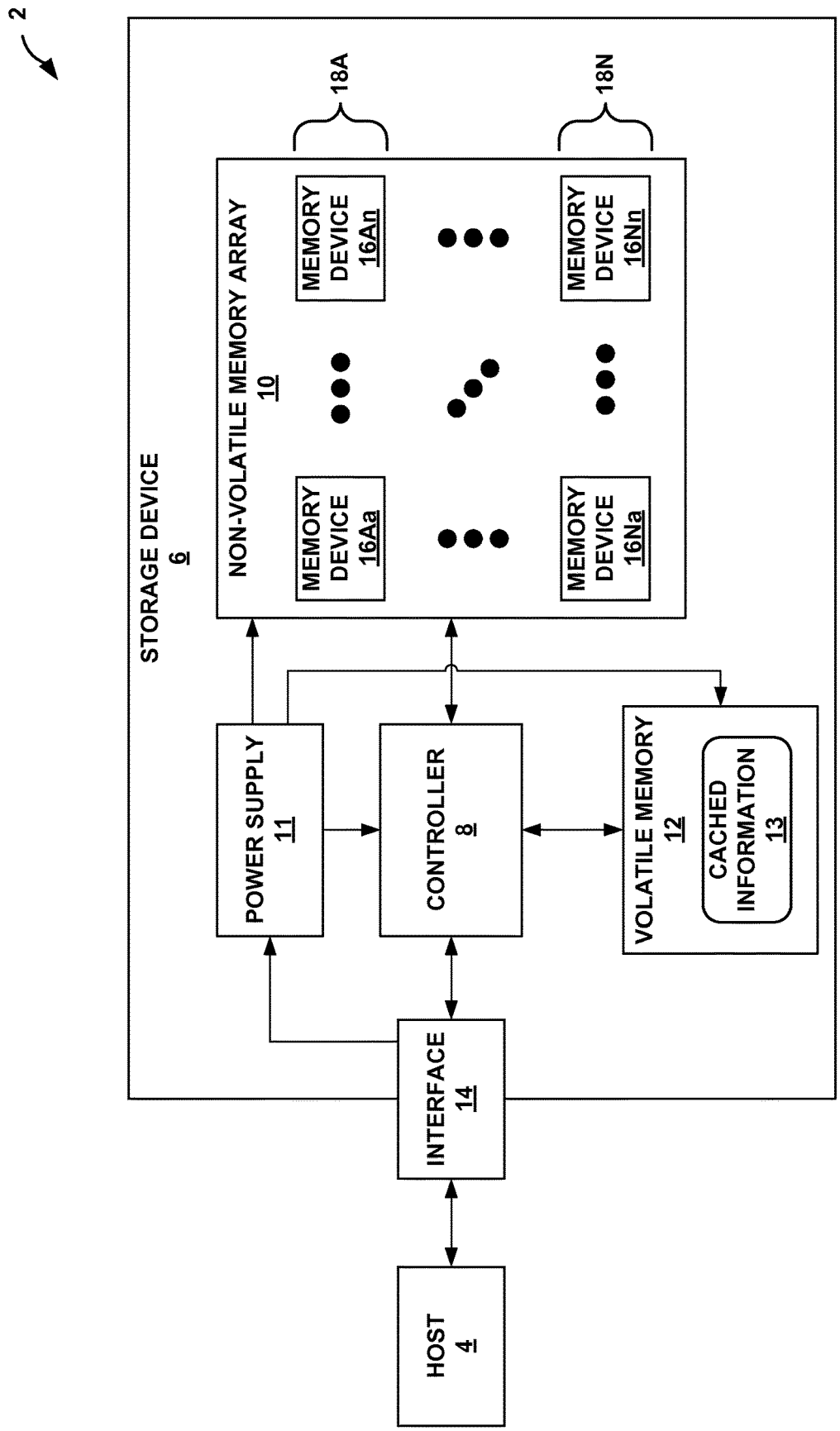
FIG. 1 is a conceptual and schematic block diagram illustrating an example storage environment in which a storage device may function as a storage device for a host device, in accordance with one or more techniques of this disclosure

This disclosure describes a storage device that includes a controller that is configured to generate exclusive-or (XOR) parity data for a plurality of data elements. Tables (1)-(5), below, illustrate an example technique which may be performed by a controller to generate XOR parity data for a plurality of data elements and update the XOR parity data in response to one of the data elements of the plurality of data elements changing. Each cell A-N+1 in Tables (1)-(5) may represent a cell (e.g., a 528 byte cell) of a flash memory capable of storing a data element. Initially, before the controller may write a first data element $d_A$ to cell A, cells A-N+1 may be initialized to zero. As shown in Table (1), the controller may XOR the data stored by cells A-N (i.e., first data element $d_A$ at this step of the example) to determine XOR parity data $X_A$, and may store $X_A$ in cell N+1 to use in verifying data stored in cells A-N (i.e., to protect the data stored by cells A-N).

TABLE (1)

| | Cell | | | | |
|---|---|---|---|---|---|
| | A | B | C | ... | N + 1 |
| Data | $d_A$ | | | ... | $X_A$ |

The controller may write a second data element $d_B$ to cell B. As shown in Table (2), the controller may XOR the data stored by cells A-N (i.e., first data element $d_A$ and second data element $d_B$ at this step of the example) to determine parity data $X_{AB}$, and may store $X_{AB}$ in cell N+1 to use in verifying data stored in the data stored in cells A-N. In some examples, such as where the data stored in cell B is not protected by the XOR parity data in cell N+1, the controller may update the parity data by XORing the XOR data in cell N+1 (i.e., $X_A$) with the data written to cell B (i.e., $d_B$) to determine updated parity data $X_{AB}$.

TABLE (2)

| | Cell | | | |
|---|---|---|---|---|
| | A | B | C | ... N + 1 |
| Data | $d_A$ | $d_B$ | | ... $X_{AB}$ |

The controller may write a third data element $d_C$ to cell C. As shown in Table (3), the controller may XOR the data stored by cells A-N (i.e., first data element $d_A$, second data element $d_B$, and third data element $d_C$ at this step of the example) to determine parity data $X_{ABC}$, and may store $X_{ABC}$ in cell N+1 to use in verifying data stored in the data stored in cells A-N. As discussed above, where the data stored in cell C is not protected by the XOR parity data in cell N+1, the controller may update the parity data by XORing the XOR data in cell N+1 (i.e., $X_{AB}$) with the data written to cell C (i.e., $d_C$) to determine updated parity data $X_{ABC}$.

TABLE (3)

| | Cell | | | |
|---|---|---|---|---|
| | A | B | C | ... N + 1 |
| Data | $d_A$ | $d_B$ | $d_C$ | ... $X_{ABC}$ |

In some examples, in addition to storing data (e.g., data received from a host of the storage device), the controller may be configured to store other information, such as metadata. As one example, the controller may be configured to store records, such as TRIM records, that indicate which physical blocks of memory devices are no longer considered in use (e.g., by the host device) and can be wiped internally, such as via garbage collection. In some examples, the size of a block of user data or an individual record (e.g., 24 bytes) may be smaller than a single cell (e.g., 528 bytes) such that a plurality of blocks of user data or records may be stored in a single cell. For instance, where each record is 24 bytes and each cell is capable of storing 528 bytes, each of data elements $d_A$, $d_B$, and $d_C$ may include twenty-two records (e.g., 528/24=22) that respectively indicate whether a respective physical block is no longer considered in use. In some examples, such as where the records include TRIM record, the records may be formatted as follows:

```
struct trim_meta_data {
    u48 pbn;        /* 48 bits unique PBN number to identify TRIM
                       records */
    u48 pbn_copy1;  /* copy of pbn */
    u48 pbn_copy2;  /* copy of pbn */
    u48 pbn_copy3;  /* copy of pbn */
};
```

In some examples, the controller may update a particular TRIM record of a plurality of TRIM records included in a particular data element. For instance, where data element $d_A$ includes a TRIM record for a particular physical block that indicates that the particular physical block is not considered in use, the controller may update the TRIM record for the particular block in response to determining that the particular physical block is in use (e.g. where the particular physical block has been reclaimed via garbage collection). To update the TRIM record, the controller may determine an updated data element $d_{A'}$ that does not include a TRIM record for the particular physical block, and store the updated data element $d_{A'}$ in the memory.

As discussed above, the controller may determine XOR parity data to use in verifying stored data, including data in updated data element $d_{A'}$. In some examples, the controller may be configured to XOR a particular sized data element with another data element of the same size. For instance, the controller may be configured to XOR a 528 byte data element with another 528 byte data element. In some examples, the particular size of data element may correspond to the size of a cell (e.g., a size of a cell of cells A-N). As such, when performing even an incremental update to a data element, such as updating a single TRIM record included in a data element, the controller may perform an XOR update for the whole set of cells A-N. For example, even though the controller may only be updating a single 24 byte record of a plurality of records included in a 528 byte data element, the controller may not be able to only update the XOR parity data that corresponds to the single record and may determine updated XOR parity data for the entire data element.

In some examples, the controller may update the first data element by writing an updated first data element $d_{A'}$ to cell A. However, as the parity data stored in cell N+1 (i.e., $X_{ABC}$) already includes first data element $d_A$, the controller may not update the XOR parity data by XORing $X_{ABC}$ with the updated first data element $d_{A'}$ as such an operation would result in $X_{ABCA'}$.

In some examples, the controller may protect the updated first data element by completely rebuilding the XOR parity data. For instance, the controller may XOR $d_{A'}$ with $d_B$ to determine $X_{A'B}$, and then XOR $X_{A'B}$ with $d_C$ to determine $X_{A'BC}$. However, rebuilding the XOR parity data in this way may not be desirable (e.g., as the controller must read the data stored by cells B and C). As such, it may be desirable for the controller to update XOR parity data to protect updated data elements without reading data stored by other cells also protected by the XOR parity data.

In accordance with one or more techniques of this disclosure, as opposed to XORing an updated data element with each other data element in a set of cells to generate updated XOR parity data, a controller may remove a previous version of the data element from the current XOR parity data by XORing the previous version of the data element with the current XOR parity data. The controller then may XOR the resulting XOR parity data with the updated data element to produce updated XOR parity data. Alternatively, the controller may XOR the updated data element with the current XOR parity data to add the updated data element to the XOR parity data and XOR the resulting XOR parity data with the previous version of the data element to remove the previous version of the data element from the XOR parity data.

For instance, as shown in Table (4), when updating the data stored in cell A, the controller may XOR the data stored by cell A (i.e., first data element $d_A$) with the current XOR parity data (i.e., $X_{ABC}$) to determine first updated XOR parity data $X_{BC}$.

TABLE (4)

| | Cell | | | |
|---|---|---|---|---|
| | A | B | C | ... N + 1 |
| Data | $d_A$ | $d_B$ | $d_C$ | ... $X_{BC}$ |

In some examples, after removing the first data element $d_A$ from the XOR parity data, the controller may write an updated first data element $d_{A'}$ to cell A, and determine updated XOR parity data to use in verifying the updated first data element (and the other data elements $d_B$ and $d_C$). For instance, as shown in Table (5), the controller may XOR the data stored by cell A (i.e., updated first data element $d_{A'}$) with the first updated XOR parity data (i.e., $X_{BC}$) to determine second updated XOR parity data $X_{A'BC}$, and may store $X_{A'BC}$ in cell N+1 to use in verifying the data stored in cells A-N. In this way, the controller may update XOR parity data to protect updated data elements without reading data stored by other cells also protected by the XOR parity data.

TABLE (5)

| | Cell | | | | |
|---|---|---|---|---|---|
| | A | B | C | ... | N + 1 |
| Data | $d_{A'}$ | $d_B$ | $d_C$ | ... | $X_{A'BC}$ |

FIG. 1 is a conceptual and schematic block diagram illustrating an example storage environment 2 in which storage device 6 may function as a storage device for host device 4, in accordance with one or more techniques of this disclosure. For instance, host device 4 may utilize non-volatile memory devices included in storage device 6 to store and retrieve data. In some examples, storage environment 2 may include a plurality of storage devices, such as storage device 6, which may operate as a storage array. For instance, storage environment 2 may include a plurality of storages devices 6 configured as a redundant array of inexpensive/independent disks (RAID) that collectively function as a mass storage device for host device 4.

Storage environment 2 may include host device 4 which may store and/or retrieve data to and/or from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1 storage device 6 may include controller 8, non-volatile memory array 10 (NVMA 10), power supply 11, volatile memory 12, and interface 14. In some examples, storage device 6 may include additional components not shown in FIG. 1 for sake of clarity. For example, storage device 6 may include a printed board (PB) to which components of storage device 6 are mechanically attached and which includes electrically conductive traces that electrically interconnect components of storage device 6; and the like. In some examples, the physical dimensions and connector configurations of storage device 6 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe x1, x4, x8, x16, PCIe Mini Card, MiniPCI, etc.). In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), and PCI-express. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4. For example, as illustrated in FIG. 1, power supply 11 may receive power from host device 4 via interface 14.

Storage device 6 may include NVMA 10, which may include a plurality of memory devices 16Aa-16Nn (collectively, "memory devices 16"). Each of memory devices 16 may be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 6 may be referred to as a die. In some examples, a single physical chip may include a plurality of dies (i.e., a plurality of memory devices 16). In some examples, each of memory devices 16 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, memory devices 16 may include any type of non-volatile memory devices. Some examples, of memory devices 16 include, but are not limited to flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Controller 6 may write data to and read data from NAND flash memory devices at the page level and erase data from NAND flash memory devices at the block level.

In some examples, it may not be practical for controller 8 to be separately connected to each memory device of memory devices 16. As such, the connections between memory devices 16 and controller 8 may be multiplexed. As an example, memory devices 16 may be grouped into channels 18A-18N (collectively, "channels 18"). For instance, as illustrated in FIG. 1, memory devices 16Aa-16Nn may be grouped into first channel 18A, and memory devices 16Na-16Nn may be grouped into $N^{th}$ channel 18N. The memory devices 16 grouped into each of channels 18 may share one or more connections to controller 8. For instance, the memory devices 16 grouped into first channel 18A may be attached to a common I/O bus and a common control bus. Storage device 6 may include a common I/O bus and a common control bus for each respective channel of channels 18. In some examples, each channel of channels 18 may include a set of chip enable (CE) lines which may be used to multiplex memory devices on each channel. For example, each CE line may be connected to a respective memory device of memory devices 18. In this way, the number of separate connections between controller 8 and memory devices 18 may be reduced. Additionally, as each channel has an independent set of connections to controller 8, the reduction in connections may not significantly affect the data throughput rate as controller 8 may simultaneously issue different commands to each channel.

In some examples, storage device 6 may include a number of memory devices 16 selected to provide a total capacity that is greater than the capacity accessible to host device 4. This is referred to as over-provisioning. For example, if storage device 6 is advertised to include 240 GB of user-accessible storage capacity, storage device 6 may include sufficient memory devices 16 to give a total storage capacity of 256 GB. The 16 GB of storage devices 16 may not be accessible to host device 4 or a user of host device 4. Instead, the additional storage devices 16 may provide additional blocks to facilitate writes, garbage collection, wear leveling, and the like. Further, the additional storage devices 16 may provide additional blocks that may be used if some blocks wear to become unusable and are retired from use. The presence of the additional blocks may allow retiring of the worn blocks without causing a change in the storage capacity available to host device 4. In some examples, the amount of over-provisioning may be defined as p=(T−D)/D, wherein p is the over-provisioning ratio, T is the total storage capacity of storage device 2, and D is the storage capacity of storage device 2 that is accessible to host device 4.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 6 may include volatile memory 12, which may be used by controller 8 to store information. In some examples, controller 8 may use volatile memory 12 as a cache. For instance, controller 8 may store cached information 13 in volatile memory 12 until cached information 13 is written to memory devices 16. As illustrated in FIG. 1, volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

Storage device 6 includes controller 8, which may manage one or more operations of storage device 6. For instance, controller 8 may manage the reading of data from and/or the writing of data to memory devices 16. In some examples, controller 8 may perform one or more operations to protect data written to memory devices 16. For instance, controller 8 may generate parity data based on one or more data elements written to memory devices 16, and write the parity data to memory devices 16. As one example, controller 8 may generate exclusive-or (XOR) parity data to protect one or more data elements as the XOR of the one or more data elements. Additional details of controller 8 are discussed below with reference to FIG. 2.

In accordance with one or more techniques of this disclosure, when updating a data element protected by XOR parity data, controller 8 may update the XOR parity data by XORing a previous version of the data element with the XOR parity data to remove the previous version of the data element from the data elements protected by the XOR parity data. For instance, where data elements $d_A$, $d_B$, and $d_C$ are stored in a memory device of memory devices 16 and are protected by XOR parity data $X_{ABC}$ also stored in a memory device of memory devices 16, controller 8 may update data element $d_A$ to $d_{A'}$ by XORing parity data $X_{ABC}$ with data element $d_A$ to determine XOR parity data $X_{BC}$ that protects data elements $d_B$ and $d_C$. Controller 8 may XOR updated data element $d_{A'}$ with XOR parity data $X_{BC}$ to determine XOR parity data $X_{A'BC}$ to use in verifying data elements $d_{A'}$, $d_B$ and, $d_C$. In this way, controller 8 may update XOR parity data to protect updated data elements without reading data stored by other cells also protected by the XOR parity data.

Figure 2:
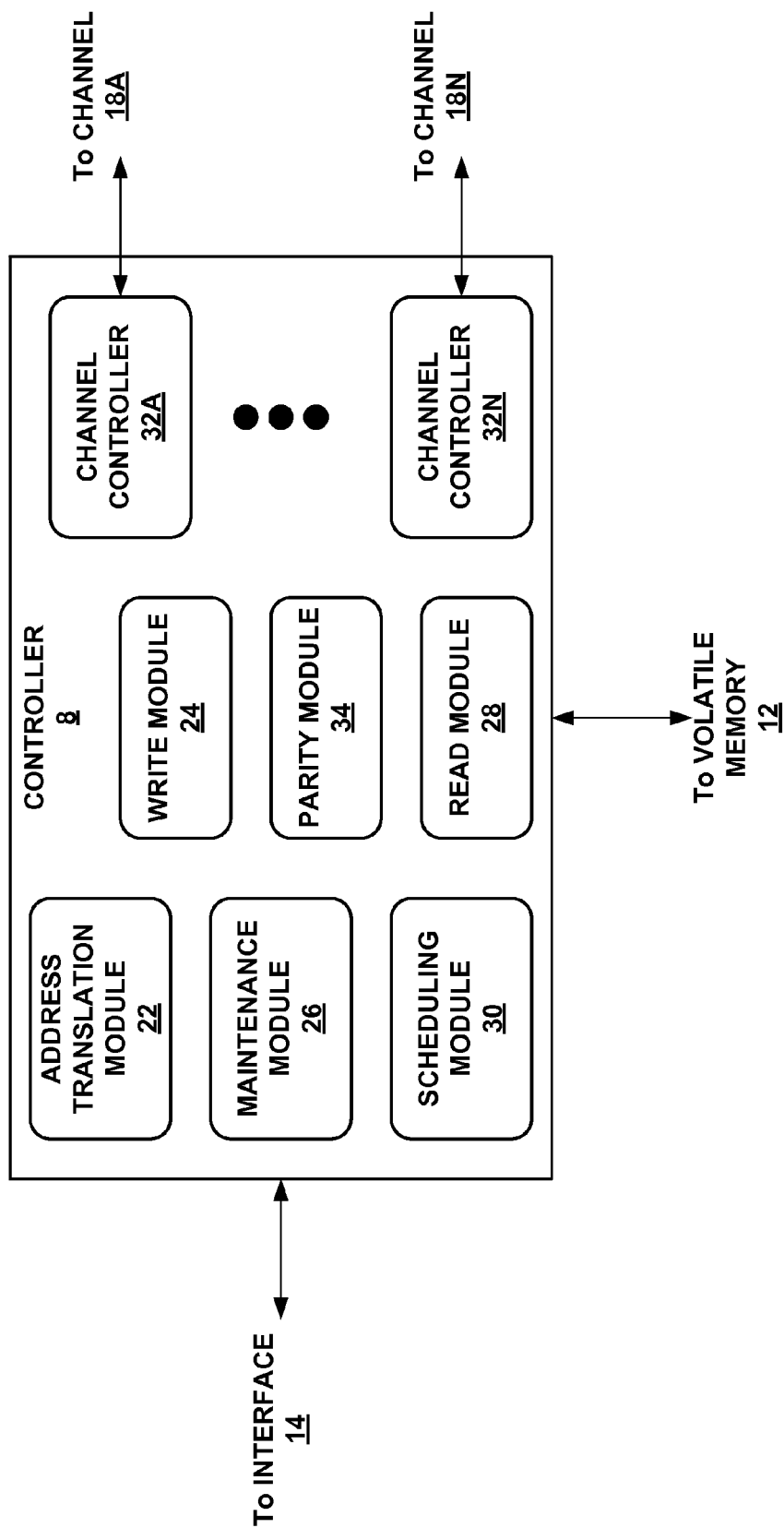
FIG. 2 is a conceptual and schematic block diagram illustrating an example controller, in accordance with one or more techniques of this disclosure.

FIG. 2 is a conceptual and schematic block diagram illustrating example details of controller 8. In some examples, controller 8 may include an address translation module 22, a write module 24, a maintenance module 26, a read module 28, a scheduling module 30, and a plurality of channel controllers 32A-32N (collectively, "channel controllers 28"). In other examples, controller 8 may include additional modules or hardware units, or may include fewer modules or hardware units. Controller 8 may include a microprocessor, digital signal processor (DSP), application specific integrated circuit (ASIC), field programmable gate array (FPGA), or other digital logic circuitry. In some examples, controller 8 may be a system on a chip (SoC).

Controller 8 may interface with the host device 4 via interface 14 and manage the storage of data to and the retrieval of data from memory devices 16. For example, write module 24 of controller 8 may manage writes to memory devices 16. For example, write module 24 may receive a message from host device 4 via interface 14 instructing storage device 6 to store data associated with a logical address and the data. Write module 24 may manage writing of the data to memory devices 16.

For example, write module 24 may communicate with address translation module 22, which manages translation between logical addresses used by host device 4 to manage storage locations of data and physical block addresses used by write module 24 to direct writing of data to memory devices. Address translation module 22 of controller 8 may utilize a flash translation layer or table that translates logical addresses (or logical block addresses) of data stored by memory devices 16 to physical block addresses of data stored by memory devices 16. For example, host device 4 may utilize the logical block addresses of the data stored by memory devices 16 in instructions or messages to storage device 6, while write module 24 utilizes physical block addresses of the data to control writing of data to memory devices 16. (Similarly, read module 28 may utilize physical block addresses to control reading of data from memory devices 16.) The physical block addresses correspond to actual, physical blocks of memory devices 16. In some examples, address translation module 22 may store the flash translation layer or table in volatile memory 12, such as within cached information 13.

In this way, host device 4 may be allowed to use a static logical block address for a certain set of data, while the physical block address at which the data is actually stored may change. Address translation module 22 may maintain the flash translation layer or table to map the logical block addresses to physical block addresses to allow use of the static logical block address by the host device 4 while the physical block address of the data may change, e.g., due to wear leveling, garbage collection, or the like.

As discussed above, write module 24 of controller 8 may perform one or more operations to manage the writing of data to memory devices 16. For example, write module 24 may manage the writing of data to memory devices 16 by selecting one or more blocks within memory devices 16 to store the data and causing memory devices of memory devices 16 that include the selected blocks to actually store the data. As discussed above, write module 24 may cause address translation module 22 to update the flash translation layer or table based on the selected blocks. For instance, write module 24 may receive a message from host device 4 that includes a unit of data and a logical block address, select a block within a particular memory device of memory devices 16 to store the data, cause the particular memory device of memory devices 16 to actually store the data (e.g., via a channel controller of channel controllers 32 that corresponds to the particular memory device), and cause address translation module 22 to update the flash translation layer or table to indicate that the logical block address corresponds to the selected block within the particular memory device.

In some examples, in addition to causing the data to be stored by memory devices 16, write module 24 may cause memory devices 16 to store information which may be used to recover the unit of data should one or more of the blocks fail or become corrupted. The parity information may be used to recover the data stored by other blocks. In some examples, the parity information may be an XOR of the data stored by the other blocks.

In order to write a bit with a logical value of 0 (charged) to a bit with a previous logical value of 1 (uncharged), a large current is used. This current may be sufficiently large that it may cause inadvertent changes to the charge of adjacent flash memory cells. To protect against inadvertent changes, an entire block of flash memory cells may be erased to a logical value of 1 (uncharged) prior to writing any data to cells within the block. Because of this, flash memory cells may be erased at the block level and written at the page level.

Thus, to write even an amount of data that would consume less than one page, controller 8 may cause an entire block to be erased. This may lead to write amplification, which refers to the ratio between the amount of data received from host device 4 to be written to memory devices 16 and the amount of data actually written to memory devices 16. Write amplification contributes to faster wearing of the flash memory cells than would occur with no write amplification. Wear to flash memory cells may occur when flash memory cells are erased due to the relatively high voltages used to erase the flash memory cells. Over a plurality of erase cycles, the relatively high voltages may result in changes to the flash memory cells. Eventually, the flash memory cells may wear out, such that data may no longer be written to the cells.

One technique that controller 8 may implement to reduce write amplification and wear of flash memory cells includes writing data received from host device 4 to unused blocks or partially used blocks. For example, if host device 4 sends data to storage device 6 that includes only a small change from data already stored by storage device 6. The controller then may mark the old data as stale or no longer valid. Over time, this may reduce a number of erase operations blocks are exposed to, compared to erasing the block that holds the old data and writing the updated data to the same block.

Responsive to receiving a write command from host device 4, write module 24 may determine at which physical locations (e.g., blocks) of memory devices 16 to write the data. For example, write module 24 may request from address translation module 22 or maintenance module 26 one or more physical block addresses that are empty (e.g., store no data), partially empty (e.g., only some pages of the block store data), or store at least some invalid (or stale) data. Upon receiving the one or more physical block addresses, write module 24 may select one or more block as discussed above, and communicate a message that causes channel controllers 32A-32N (collectively, "channel controllers 32") to write the data to the selected blocks.

Read module 28 similarly may control reading of data from memory devices 16. For example, read module 28 may receive a message from host device 4 requesting data with an associated logical block address. Address translation module 22 may convert the logical block address to a physical block address using the flash translation layer or table. Read module 28 then may control one or more of channel controllers 32 to retrieve the data from the physical block addresses. Similar to write module 24, read module 28 may select one or more blocks and communicate a message to that causes channel controllers 32 to read the data from the selected blocks.

Each channel controller of channel controllers 32 may be connected to a respective channel of channels 18. In some examples, controller 8 may include the same number of channel controllers 32 as the number of channels 18 of storage device 2. Channel controllers 32 may perform the intimate control of addressing, programming, erasing, and reading of memory devices 16 connected to respective channels, e.g., under control of write module 24, read module 28, and/or maintenance module 26.

Maintenance module 26 may be configured to perform operations related to maintaining performance and extending the useful life of storage device 6 (e.g., memory devices 16). For example, maintenance module 26 may implement at least one of wear leveling or garbage collection.

As described above, erasing flash memory cells may use relatively high voltages, which, over a plurality of erase operations, may cause changes to the flash memory cells. After a certain number of erase operations, flash memory cells may degrade to the extent that data no longer may be written to the flash memory cells, and a block including those cells may be retired (no longer used by controller 8 to store data). To increase the amount of data that may be written to memory devices 16 before blocks are worn and retired, maintenance module 26 may implement wear leveling.

In wear leveling, maintenance module 26 may track a number of erases of or writes to a block or a group of blocks, for each block or group of blocks. Maintenance module 26 may cause incoming data from host device 4 to be written to a block or group of blocks that has undergone relatively fewer writes or erases, to attempt to maintain the number of writes or erases for each block or group of blocks approximately equal. This may cause each block of memory devices 16 to wear out at approximately the same rate, and may increase the useful lifetime of storage device 6.

Although this may reduce write amplification and wear of flash memory cells by reducing a number of erases and writing data to different blocks, this also may lead to blocks including some valid (fresh) data and some invalid (stale) data. To combat this, maintenance module 26 may implement garbage collection. In a garbage collection operation, maintenance module 26 may analyze the contents of the blocks of memory devices 16 to determine a block that contain a high percentage of invalid (stale) data. Maintenance module 26 then may rewrite the valid data from the block to a different block, and then erase the block. This may reduce an amount of invalid (stale) data stored by memory devices 16 and increase a number of free blocks, but also may increase write amplification and wear of memory devices 16.

Scheduling module 30 of controller 8 may schedule operations to be performed by memory devices 16. For instance, scheduling module 30 may cause one or more of memory devices 16 to perform one or more operations based on requests received from other components of controller 8. In some examples, scheduling module 30 may cause a particular memory device of memory devices 16 to perform one or more operations by causing a channel controller corresponding to the particular memory device to output commands to the particular memory device. As one example, scheduling module 30 may permit channel controller 32A to output commands that cause memory device 16Aa to store data.

Parity module 34 of controller 8 may perform one or more operations to protect data stored on one or more of memory devices 16 by generating parity data to use in verifying the stored data. For instance, parity module 34 may generate parity data for one or more data elements stored on one or more of memory devices 16 and cause the parity data to be stored on one or more of memory devices 16. As one example, parity module 34 may generate exclusive-or (XOR) parity data based on a plurality of data elements by XORing the plurality of data elements. In some examples, parity module 34 may be configured to XOR a particular sized data element with another data element of the same size. For instance, parity module 34 may be configured to XOR a 528 byte data element with another 528 byte data element.

In accordance with one or more techniques of this disclosure, as opposed to XORing an updated data element with current XOR parity data, parity module 34 may remove a previous version of the data element from current XOR parity data by XORing the previous version of the data element with the current XOR parity data. As one example, parity module 34 may remove a previous version of a data element from current XOR parity data in accordance with the techniques discussed above with reference to Tables (1)-(5). Further details of the operations of parity module 34 are discussed below with reference to FIG. 3.

Figure 3:
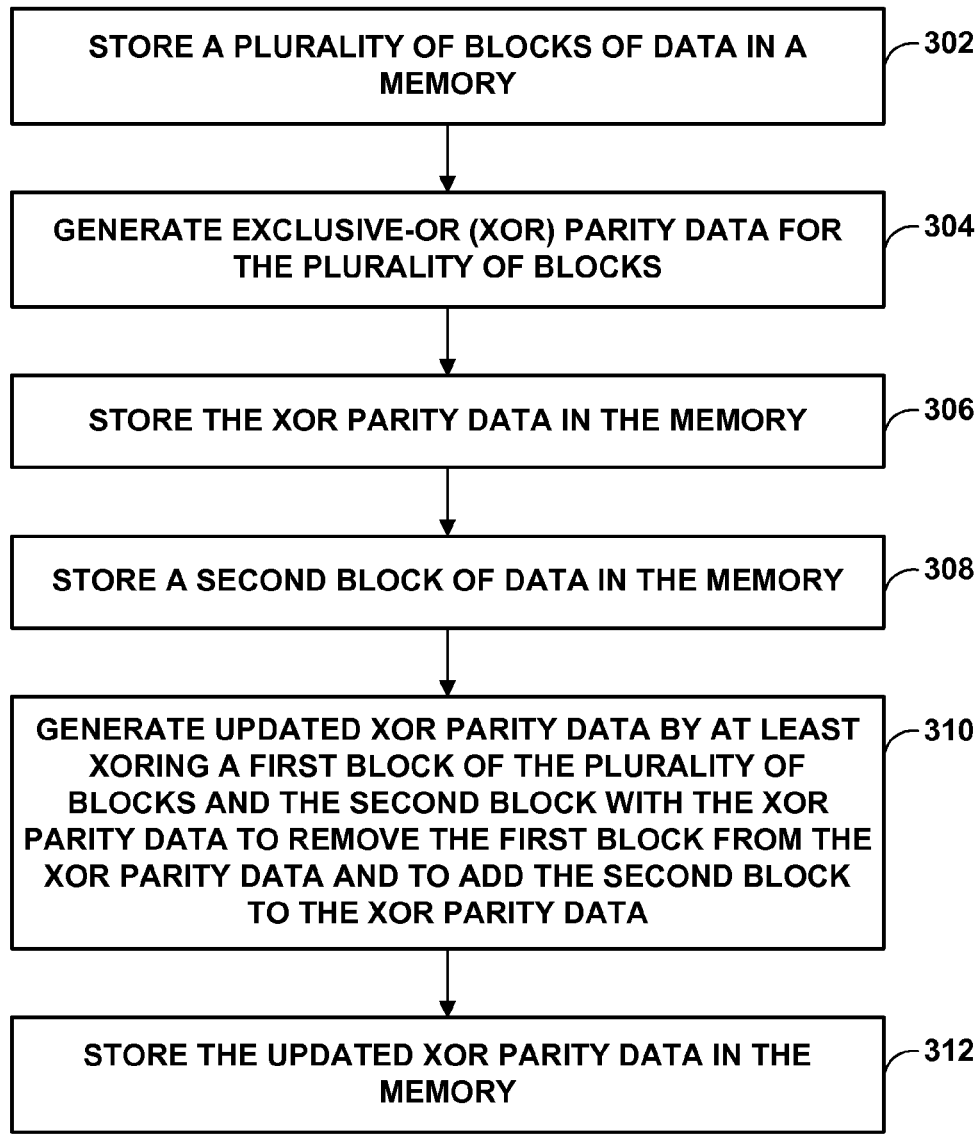
FIG. 3 is a flow diagram illustrating an example technique for updating parity data when updating a data element protected by the parity data, in accordance with one or more techniques of this disclosure.

FIG. 3 is a flow diagram illustrating an example technique for updating parity data when updating a data element protected by the parity data, in accordance with one or more techniques of this disclosure. The techniques of FIG. 3 will be described with concurrent reference to storage device 6 of FIG. 1 and controller 8 of FIG. 1 and FIG. 2 for ease of description, although storage devices having configurations different than that of storage device 6, and controller 8 may perform the techniques of FIG. 3.

In accordance with one or more techniques of this disclosure, controller 8 of storage device 6 may store a plurality of blocks of data in a memory of storage device 6 (302). For instance, write module 24 of controller 8 may store the plurality of blocks of data in one or more of memory devices 16. As one example, write module 24 may store data blocks $d_A$, $d_B$, and $d_C$ in cells of a memory device of memory devices 16.

Controller 8 may generate exclusive-or (XOR) parity data for the plurality of blocks (304). In some examples, controller 8 may generate a block of parity data to protect a plurality of memory cells that may each be configured to store a block of data. For instance, parity module 34 may generate XOR parity data for data blocks $d_A$, $d_B$, and $d_C$ by XORing data block $d_A$ with data block $d_B$ to generate $X_{AB}$, and XORing $X_{AB}$ with data block $d_C$ to generate $X_{ABC}$. In some examples, parity module 34 may generate XOR parity data in response to write module 24 writing new data. For instance, in response to write module 24 storing data block $d_A$ in an empty cell of a plurality of cells that are protected by a particular block of XOR parity data (i.e., X), parity module 34 may update the particular block of XOR parity data by XORing data block $d_A$ with the particular block of XOR parity data (i.e., $X=X \oplus d_A$). In some examples, parity module 34 may update the particular block of XOR parity data in accordance with equation (1), below, where $X_U$ is an updated version of the particular block of XOR parity data, $X_C$ is a current version of the particular block of XOR parity data, and $d_A$ is a current version of the data block. As data block $d_A$ was not protected by the current version of the particular block of XOR parity data $X_C$, the updated version of the particular block of XOR parity data $X_U$ will be the XOR of any data blocks previously protected by $X_C$ and data block $d_A$.

$$X_U = X_C \oplus d_A \quad (1)$$

Controller 8 may store the XOR parity data in the memory (306). For instance, parity module 34 may store the XOR parity data in one or more of memory devices 16. In some examples, parity module 34 may store the XOR parity data by causing write module 24 to store the XOR parity data.

Controller 8 may store a second block of data in the memory of storage device 6 (308). For instance, write module 24 may store the second block of data in one or more of memory devices 16. As one example, write module 24 may store data block $d_D$ in a cell of a memory device of memory devices 16.

Controller 8 may generate updated XOR parity data by at least sequentially XORing a first block of the plurality of blocks and the second block with the XOR parity data to remove the first block from the XOR parity data and to add the second block to the XOR parity data (310). For instance, as opposed to XORing an updated data element with each other data element in a set of cells to generate updated XOR parity data, controller 8 may remove a previous version of the data element from the current XOR parity data by XORing the previous version of the data element with the current XOR parity data. Controller 8 may then XOR the resulting XOR parity data with the updated data element to produce updated XOR parity data. Alternatively, controller 8 may XOR the updated data element with the current XOR parity data to add the updated data element to the XOR parity data and XOR the resulting XOR parity data with the previous version of the data element to remove the previous version of the data element from the XOR parity data.

For example, where a data block stored in a cell of a plurality of cells protected by the XOR parity data is to be updated, parity module 34 may XOR a current version of the data block with the XOR parity data to remove the current version of the data block from the XOR parity data. In some examples, parity module 34 may generate the updated XOR parity data in accordance with equation (2), below, where $X_U$ is an updated version of the particular block of XOR parity data, $X_C$ is a current version of the particular block of XOR parity data, and $d_A$ is a current version of the data block. As the current version of data block $d_A$ was protected by the current version of the particular block of XOR parity data $X_C$, the updated version of the particular block of XOR parity data $X_U$ will be the XOR of any data blocks previously protected by $X_C$ except for the current version of data block $d_A$.

$$X_U = X_C \oplus d_A \qquad (2)$$

Controller 8 may store the updated XOR parity data in the memory (312). For instance, parity module 34 may store the updated XOR parity data in one or more of memory devices 16. In some examples, parity module 34 may store the updated XOR parity data by causing write module 24 to store the updated XOR parity data. In some examples, controller 8 may store the updated XOR parity data in the same location in the memory so as to overwrite the current XOR parity data.

In some examples, the second block of data may be an updated version of data block $d_A$. As one example, write module 24 may store the updated version of data block $d_A$ in a cell of a memory device of memory devices 16. For instance, write module 24 of controller 8 may store the updated version of data block $d_{A'}$ in a cell of the plurality of cells protected by the XOR parity data. In some examples, write module 24 may store the updated version of data block $d_{A'}$ in a different location than the location at which the previous version of block $d_A$ is stored. In some examples, write module 24 may store the updated version of data block $d_{A'}$ in the same location as the location at which the previous version of block $d_A$ is stored so as to overwrite the previous version of block $d_A$.

In some examples, controller 8 may not be able to guarantee to atomicity of certain operations. For instance, in the event of power loss after removing a previous version of a data element from XOR parity data, controller 8 may not be able to guarantee that an updated version of the data element is written and included in the XOR parity data.

Without such a guarantee of atomicity, there may be a loss of data in the event of a power loss. For instance, to continue with the above example, the updated version of the data element may be lost. As such, it may be desirable for controller 8 to prevent a loss of data in the event of a power loss.

In accordance with one or more techniques of this disclosure, as opposed to overwriting a current version of a data block with an updated version of the data block, controller 8 may store the updated version of the data block in a different location in the memory. In some examples, the different location in the memory may be referred to as a spare cell. As shown in Table (6), controller 8 may store data blocks $d_A$-$d_C$ in cells A-C and XOR parity data $X_{ABC}$ may be stored in cell N+1, and cell D may be marked as a spare cell. In some examples, data blocks $d_A$-$d_C$ may each include a plurality of records. As one example, data blocks $d_A$-$d_C$ may each include metadata records, such as TRIM records that indicate which blocks of memory devices 16 are no longer considered in use (e.g., by host device 4) and can be wiped internally, such as via garbage collection. As another example, data blocks $d_A$-$d_C$ may each include user data (e.g., data received from host 4).

TABLE (6)

| | Cell | | | | |
|---|---|---|---|---|---|
| | A | B | C | D | ... | N + 1 |
| Data | $d_A$ | $d_B$ | $d_C$ | spare | ... | $X_{ABC}$ |

Controller 8 may determine to update a data block of the plurality of data blocks. For instance, where host device 4 issues a TRIM command that indicates that a particular block of memory device 16Bc is no longer in use, controller 8 may update the data block of the plurality of data blocks that includes the TRIM record for the particular block of memory device 16Bc to indicate that the particular block of memory device 16Bc is no longer in use. As one example, controller 8 may generate updated data block $d_{A'}$ by adding the TRIM record for the particular block of memory device 16Bc to indicate that the particular block of memory device 16Bc is no longer in use.

As shown in Table (7), as opposed to writing updated data block $d_{A'}$ to cell A to overwrite data block $d_A$, controller 8 may write updated data block $d_{A'}$ to spare cell D. Additionally, controller 8 may generate updated XOR parity data to protect updated data block $d_{A'}$. For instance, controller 8 may XOR current XOR parity data $X_{ABC}$ with updated data block $d_{A'}$ to generate updated XOR parity data $X_{ABCA'}$. As also shown in Table (7), controller 8 may overwrite current XOR parity data $X_{ABC}$ with updated XOR parity data $X_{ABCA'}$.

TABLE (7)

| | Cell | | | | |
|---|---|---|---|---|---|
| | A | B | C | D | ... | N + 1 |
| Data | $d_A$ | $d_B$ | $d_C$ | $d_{A'}$ | ... | $X_{ABCA'}$ |

In some examples, after writing updated XOR parity data $X_{ABCA'}$, controller 8 may determine that the updated data block $d_{A'}$ has been successfully stored. As such, controller 8 may avoid determining that the updated data block $d_{A'}$ has been successfully stored until both the updated data block $d_{A'}$ and its corresponding parity data have been successfully written. In some examples, once controller 8 has indicated that a data block has been successfully written, loss of either the data block of its corresponding parity data may constitute data loss. If controller 8 loses power after writing the updated data block $d_{A'}$ to cell D and writing the updated XOR parity data $X_{ABCA'}$ to cell N+1, controller 8 may avoid data loss because the updated data block $d_{A'}$ is both stored by cell D and is protected by the XOR parity data stored by cell N+1.

As shown in Table (8), and as discussed above, controller 8 may remove data block $d_A$ from the XOR parity data. For instance, controller 8 may XOR data block $d_A$ with current XOR parity data $X_{ABCA'}$ to generate updated XOR parity data $X_{BCA'}$. As also shown in Table (8), controller 8 may overwrite current XOR parity data $X_{ABCA'}$ with updated XOR parity data $X_{BCA'}$. Similar to above, if controller 8 loses power after writing the updated XOR parity data $X_{BCA'}$ to cell N+1, controller 8 may still avoid data loss because the updated data block $d_{A'}$ is both stored by cell D and is protected by the XOR parity data stored by cell N+1.

TABLE (8)

| | | | Cell | | |
|---|---|---|---|---|---|
| | A | B | C | D | ... | N + 1 |
| Data | $d_A$ | $d_B$ | $d_C$ | $d_{A'}$ | ... | $X_{BCA'}$ |

As shown in Table (9), after removing data block $d_A$ from the XOR parity data, controller 8 may mark cell A (i.e., the cell that stores data block $d_A$) a spare cell. When updating one or more of the data blocks protected by the XOR parity data for cells A-N, controller 8 may repeat the above steps using cell A as the spare cell. For instance, when storing updated data block $d_{B'}$, controller 8 may write updated data block $d_{B'}$ to cell A, XOR updated data block $d_{B'}$ with current XOR parity data $X_{BCA'}$ to generate updated XOR parity data $X_{BCA'B'}$, write updated XOR parity data $X_{BCA'B'}$ to cell N+1, XOR data block $d_B$ with then current XOR parity data $X_{BCA'B'}$ to generate updated XOR parity data $X_{CA'B'}$, and mark cell B as a spare cell.

TABLE (9)

| | | | Cell | | |
|---|---|---|---|---|---|
| | A | B | C | D | ... | N + 1 |
| Data | spare | $d_B$ | $d_C$ | $d_{A'}$ | ... | $X_{BCA'}$ |

The following examples may illustrate one or more of the techniques of this disclosure.

EXAMPLE 1

A method comprising: storing, by a controller of a storage device, a plurality of blocks of data in a memory of the storage device; determining, by the controller, exclusive-or (XOR) parity data for the plurality of blocks of data; storing, by the controller, the XOR parity data in the memory; storing a second block of data in the memory; generating updated XOR parity data by at least XORing a first block of the plurality of blocks and the second block of data with the XOR parity data to remove the first block from the XOR parity data and to add the second block to the XOR parity data; and storing the updated XOR parity data in the memory.

EXAMPLE 2

The method of example 1, wherein: storing the plurality of blocks of data in the memory comprises storing the first block at a particular location in the memory, storing the second block in the memory comprises storing the second block at the particular location in the memory, and generating the updated XOR parity data comprises XORing the first block with the XOR parity data before XORing the second block with the XOR parity data.

EXAMPLE 3

The method of example 1, wherein: storing the plurality of blocks of data in the memory comprises storing the first block at a first location in the memory, storing the second block in the memory comprises storing the second block at a second location in the memory that is different than the first location, and the controller stores the second block in the memory prior to removing the first block from the XOR parity data such that the first block and the second block are both stored in the memory concurrently.

EXAMPLE 4

The method of any combination of examples 1-3, wherein the controller removes the first block from the XOR parity data before adding the second block to the XOR parity data.

EXAMPLE 5

The method of any combination of examples 1-4, wherein the second location in the memory is marked as a spare location prior to storing the second block, the method further comprising: marking the first location in the memory as the spare location after removing the first block from the XOR parity data; storing a third block of data at the spare location in the memory; removing, by the controller, a fourth block of the plurality of blocks of data from the XOR parity data; adding, by the controller, the third block to the XOR parity data; and marking a location in the memory where the fourth block is stored as the spare location.

EXAMPLE 6

The method of any combination of examples 1-5, wherein the first block of data includes a plurality of metadata records that respectively correspond to a plurality of physical blocks of the memory, the method further comprising updating a metadata record for a particular physical block by at least: generating the second block of data as including an updated version of the metadata record for the particular physical block and an original version of at least another of the plurality of metadata records included in the first data block.

EXAMPLE 7

A data storage device comprising: a memory; and a controller configured to: store a plurality of blocks of data in the memory; determine exclusive-or (XOR) parity data for the plurality of blocks; store the XOR parity data in the memory; store a second block of data in the memory; generate updated XOR parity data by at least XORing a first block of the plurality of blocks and the second block of data with the XOR parity data to remove the first block from the XOR parity data and to add the second block to the XOR parity data; and store the updated XOR parity data in the memory.

EXAMPLE 8

The data storage device of example 7, wherein the controller is further configured to perform the method of any combination of examples 1-6.

EXAMPLE 9

A system comprising means for performing the method of any combination of examples 1-6.

EXAMPLE 10

A computer-readable storage medium storing instructions that, when executed, cause a controller of a storage device to perform the method of any combination of examples 1-6.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method of protecting data in a data storage device in an event of a data update, comprising:
   storing, by a controller of a data storage device, a plurality of blocks of data in a memory of the data storage device;
   determining, by the controller and based on the plurality of blocks of data, exclusive-or (XOR) parity data;
   storing, by the controller, the XOR parity data in the memory;
   storing a new block of data in the memory;
   generating updated XOR parity data without reading the plurality of blocks of data stored in the memory by at least XORing an old block of data of the plurality of blocks of data and the new block of data with the XOR parity data to remove the old block of data from the XOR parity data and to add the new block of data to the XOR parity data; and
   storing the updated XOR parity data in the memory, wherein the old block of data and the new block of data are protected during the data update.

2. The method of claim 1, wherein:
   storing the plurality of blocks of data in the memory comprises storing the old block of data at a particular location in the memory,
   storing the new block of data in the memory comprises storing the new block of data at the particular location in the memory, and
   generating the updated XOR parity data comprises XORing the old block of data with the XOR parity data before XORing the new block of data with the XOR parity data.

3. The method of claim 1, wherein:
   storing the plurality of blocks of data in the memory comprises storing the old block of data at a first location in the memory,
   storing the new block of data in the memory comprises storing the new block of data at a second location in the memory that is different than the first location, and
   the controller stores the new block of data in the memory prior to removing the old block of data from the XOR parity data such that the old block of data and the new block of data are both stored in the memory concurrently.

4. The method of claim 3, wherein the controller removes the old block of data from the XOR parity data before adding the new block of data to the XOR parity data.

5. The method of claim 3, wherein the second location in the memory is marked as a spare location prior to storing the new block of data, the method further comprising:
   marking the first location in the memory as the spare location after removing the old block of data from the XOR parity data;
   storing a second new block of data at the spare location in the memory;
   removing, by the controller, a second old block of data of the plurality of blocks of data from the XOR parity data;
   adding, by the controller, the second new block of data to the XOR parity data; and
   marking a location in the memory where the second old block of data is stored as the spare location.

6. The method of claim 1, wherein the old block of data includes a plurality of metadata records that respectively correspond to a plurality of physical blocks of the memory, the method further comprising updating a metadata record for a particular physical block by at least:
   generating the new block of data as including an updated version of the metadata record for the particular physical block and an original version of at least another of the plurality of metadata records included in the old block of data.

7. A data storage device with reduced data loss during a data update, comprising:
a memory; and
a controller configured to:
store a plurality of blocks of data in the memory;
determine, based on the plurality of blocks of data, exclusive-or (XOR) parity data;
store the XOR parity data in the memory;
store a new block of data in the memory;
generate updated XOR parity data without reading the plurality of blocks of data stored in the memory by at least XORing an old block of data of the plurality of blocks of data and the new block of data with the XOR parity data to remove the old block of data from the XOR parity data and to add the new block of data to the XOR parity data; and
store the updated XOR parity data in the memory, wherein the old block of data and the new block of data are protected during the data update.

8. The data storage device of claim 7, wherein:
the controller is configured to store the plurality of blocks of data in the memory by at least storing the old block of data at a particular location in the memory,
the controller is configured to store the new block of data in the memory by at least storing the new block of data at the particular location in the memory, and
the controller is configured to generate the updated XOR parity data by at least XORing the old block of data with the XOR parity data before XORing the new block of data with the XOR parity data.

9. The data storage device of claim 7, wherein:
the controller is configured to store the plurality of blocks of data in the memory by at least storing the old block of data at a first location in the memory,
the controller is configured to store the new block of data in the memory by at least storing the new block of data at a second location in the memory that is different than the first location, and
the controller is configured to store the new block of data in the memory prior to removing the old block of data from the XOR parity data such that the old block of data and the new block of data are both stored in the memory concurrently.

10. The data storage device of claim 9, wherein the controller is configured to remove the old block of data from the XOR parity data before adding the new block of data to the XOR parity data.

11. The data storage device of claim 9, wherein the controller is configured to mark the second location in the memory as a spare location prior to storing the new block of data, and wherein the controller is further configured to:
mark the first location in the memory as the spare location after removing the old block of data from the XOR parity data;
store a second new block of data at the spare location in the memory;
remove a second old block of data of the plurality of blocks of data from the XOR parity data;
add the second new block of data to the XOR parity data; and
mark a location in the memory where the second old block of data is stored as the spare location.

12. The data storage device of claim 7, wherein the old block of data includes a plurality of metadata records that respectively correspond to a plurality of physical blocks of the memory, and wherein the controller is further configured to update a metadata record for a particular physical block by at least:
generating the new block of data as including an updated version of the metadata record for the particular physical block and an original version of at least another of the plurality of metadata records included in the old block of data.

13. A data storage system with reduced data loss during a data update comprising:
means for storing a plurality of blocks of data in a memory of a storage device;
means for determining, based on the plurality of blocks of data, exclusive-or (XOR) parity data;
means for storing the XOR parity data in the memory;
means for storing a new block of data in the memory;
means for generating without reading the plurality of blocks of data stored in the memory updated XOR parity data by at least XORing an old block of data of the plurality of blocks of data and the new block of data with the XOR parity data to remove the old block of data from the XOR parity data and to add the new block of data to the XOR parity data; and
means for storing the updated XOR parity data in the memory, wherein the old block of data and the new block of data are protected during the data update.

14. The system of claim 13, wherein:
the means for storing the plurality of blocks of data in the memory comprise means for storing the old block of data at a particular location in the memory,
the means for storing the new block of data in the memory comprise means for storing the new block of data at the particular location in the memory, and
the means for generating the updated XOR parity data comprise means for XORing the old block of data with the XOR parity data before XORing the new block of data with the XOR parity data.

15. The system of claim 13, wherein:
the means for storing the plurality of blocks of data in the memory comprise means for storing the old block of data at a first location in the memory,
the means for storing the new block of data in the memory comprise means for storing the new block of data at a second location in the memory that is different than the first location, and
the means for storing the new block of data in the memory comprise means for storing the new block of data in the memory prior to removing the old block of data from the XOR parity data such that the old block of data and the new block of data are both stored in the memory concurrently.

16. The system of claim 15, wherein the means for generating the XOR parity data comprise means for removing the old block of data from the XOR parity data before adding the new block of data to the XOR parity data.

17. A non-transitory computer-readable storage medium storing instructions that, when executed, cause a controller of a data storage device to a perform a method of protecting data in an event of a data update, the method comprising:
storing a plurality of blocks of data in a memory of the storage device;
determining, based on the plurality of blocks of data, exclusive-or (XOR) parity data;
storing the XOR parity data in the memory;
storing a new block of data in the memory;
generating updated XOR parity data without reading the plurality of blocks of data stored in the memory by at least XORing an old block of data of the plurality of blocks of data and the new block of data with the XOR parity data to remove the old block of data from the XOR parity data and to add the new block of data to the XOR parity data; and storing the updated XOR parity data in the memory, wherein the old block of data and the new block of data are protected during the data update.

18. The computer-readable storage medium of claim 17, wherein:

storing the plurality of blocks of data in the memory comprises storing the old block of data at a particular location in the memory, storing the new block of data in the memory comprises storing the new block of data at the particular location in the memory, and generating the updated XOR parity data comprises XORing the old block of data with the XOR parity data before XORing the new block of data with the XOR parity data.

19. The computer-readable storage medium of claim 17, wherein:

storing the plurality of blocks of data in the memory comprises storing the old block of data at a first location in the memory, storing the new block of data in the memory comprises storing the second block of data at a second location in the memory that is different than the first location, and storing the new block of data in the memory comprises storing the new block of data in the memory prior to removing the old block of data from the XOR parity data such that the old block of data and the new block of data are both stored in the memory concurrently.

20. The computer-readable storage medium of claim 19, wherein removing the old block of data from the XOR parity data comprises removing the old block of data from the XOR parity data before adding the new block of data to the XOR parity data.

* * * * *